United States Patent
Chang et al.

(10) Patent No.: US 11,139,742 B2
(45) Date of Patent: Oct. 5, 2021

(54) SWITCHING CONTROLLER CIRCUIT AND METHOD FOR CONTROLLING FLYBACK POWER CONVERTER

(71) Applicant: RICHTEK TECHNOLOGY CORPORATION, Zhubei (TW)

(72) Inventors: Wei-Hsu Chang, Hsinchu (TW); Ta-Yung Yang, Taoyuan (TW); Yu-Chang Chen, Nantou (TW); Chao-Chi Chen, New Taipei (TW); Chuh-Ching Li, Hsinchu (TW); Li-Di Lo, Taichung (TW); Hao-Wen Chung, Hsinchu (TW)

( * ) Notice: Subject to any disclaimer, the term of this patent is extended or adjusted under 35 U.S.C. 154(b) by 0 days.

(21) Appl. No.: 16/879,692

(22) Filed: May 20, 2020

(65) Prior Publication Data

US 2021/0126543 A1    Apr. 29, 2021

Related U.S. Application Data

(60) Provisional application No. 62/925,724, filed on Oct. 24, 2019.

(30) Foreign Application Priority Data

Mar. 2, 2020  (TW) .................. 109106700

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 1/0058* (2021.05)

(58) Field of Classification Search
CPC .. H02M 3/33592; H02M 1/08; H02M 1/0058; H02M 3/33523
See application file for complete search history.

(56) References Cited

U.S. PATENT DOCUMENTS

| | | | |
|---|---|---|---|
| 8,749,994 B2* | 6/2014 | Kleinpenning ... | H02M 3/33523 363/19 |
| 8,917,068 B2 | 12/2014 | Chen et al. | |
| 10,992,234 B2* | 4/2021 | Moon ............... | H02M 1/08 |
| 2011/0305048 A1 | 12/2011 | Yang et al. | |
| 2018/0294734 A1 | 10/2018 | Song et al. | |
| 2021/0143730 A1* | 5/2021 | Yang ............... | H02M 3/33523 |

* cited by examiner

*Primary Examiner* — Kyle J Moody
(74) *Attorney, Agent, or Firm* — Tung & Associates

(57) ABSTRACT

A switching controller circuit for controlling a flyback power converter includes: a power transformer, a primary side controller circuit and a secondary side controller circuit. The power transformer is coupled between the input voltage and the output voltage in an isolated manner. The primary side controller circuit controls a primary side switch of the flyback power converter. The secondary side controller circuit generates a synchronous rectification (SR) signal, to control an SR switch of the flyback power converter. The SR signal includes an SR pulse and a soft switching (SS) pulse. The SR pulse controls the SR switch to be ON for an SR period, to achieve synchronous rectification at the secondary side. The SS pulse controls the SR switch to be ON for an SS period, to achieve soft switching of the primary side switch.

22 Claims, 12 Drawing Sheets

SWITCHING CONTROLLER CIRCUIT AND METHOD FOR CONTROLLING FLYBACK POWER CONVERTER

CROSS REFERENCE

The present invention claims priority to U.S. 62/925,724 filed on Oct. 24, 2019 and claims priority to TW 109106700 filed on Mar. 2, 2020.

BACKGROUND OF THE INVENTION

Field of Invention

The present invention relates to a switching controller circuit; particularly, it relates to such switching controller circuit capable of controlling a flyback power converter. The present invention also relates to a method for controlling a flyback power converter.

Description of Related Art

The following prior arts are relevant to the present invention: K.-H. Chen, T.-J. Liang, "Design of Quasi-resonant flyback converter control IC with DCM and CCM operation", IEEE International Power Electronics Conference, 2014; U.S. Pat. No. 8,917,068 B2, S. Chen, J. Jin, "Quasi-resonant controlling and driving circuit and method for a flyback converter", 2014; US 2011/0305048 A1, T.-Y. Yang, Y.-C. Su, C.-C. Lin, "Active-Clamp Circuit for Quasi-Resonant Flyback Power Converter", 2011; A. A. Saliva, "Design Guide for QR Flyback Converter, Design Note DN 2013-01", Infineon Technologies North America Corp, 2013 (which is available on-line at https://www.mouser.com/pdfdocs/2-9.pdf); W. Yuan, etc., "Novel Soft Switching Flyback Converter with Synchronous Rectification", IEEE IPEMC 2009; and X. Huang, etc., "A Novel Variable Frequency Soft Switching Method for Flyback Converter with Synchronous Rectifier", IEEE 2010.

Please refer to FIG. 1A along with FIG. 1B. FIG. 1A shows a schematic diagram of a conventional flyback power converter (i.e., flyback power converter 1). FIG. 1B illustrates a waveform diagram depicting the operation of the conventional flyback power converter of FIG. 1A. A primary side controller circuit 80 controls a primary side switch S1 which controls the power transformer 10 to generate an output voltage Vo. The secondary side controller circuit 90 is configured to operably generate a synchronous rectification (SR) signal S2C, to control an SR switch S2 to achieve synchronous rectification at the secondary side.

The prior art shown in FIG. 1A and FIG. 1B has the following drawbacks that: the SR switch S2 cannot be in precise synchronization with the primary side switch S1 at the primary side, and if the primary side switch S1 does not perform soft switching (SS), the flyback power converter 1 will have poor power conversion efficiency.

As compared to the prior art in FIG. 1A and FIG. 1B, the present invention is advantageous in that: the SR switch S2 of the present invention is in precise synchronization with the primary side switch S1. In addition, by the soft switching (SS) pulse of the SR switch S2, the primary side switch S1 can achieve soft switching, thus effectively enhancing the power conversion efficiency. Moreover, the switching controller circuit of the present invention can adaptively determine an optimal ON period and an optimal delayed period of the SS pulse according to different operation modes.

SUMMARY OF THE INVENTION

From one perspective, the present invention provides a switching controller circuit, which is configured to operably control a flyback power converter, so as to convert an input voltage to an output voltage; the switching controller circuit comprising: a power transformer, which is coupled between the input voltage and the output voltage in an isolated manner; a primary side controller circuit, which is configured to operably generate a switching signal, to control a primary side switch of the flyback power converter, thereby controlling the primary side winding of the power transformer, wherein the primary side winding is coupled to the input voltage; and a secondary side controller circuit, which is configured to operably generate a synchronous rectification (SR) signal, to control an SR switch of the flyback power converter, thereby controlling a secondary side winding of the power transformer, so as to generate the output voltage, wherein the SR signal includes an SR pulse and a soft switching (SS) pulse, wherein the SR pulse is configured to operably control the SR switch to be ON for an SR period, to achieve synchronous rectification at the secondary side, and wherein the SS pulse is configured to operably control the SR switch to be ON for an SS period, thereby achieving soft switching of the primary side switch; wherein the power transformer is magnetized when the primary side switch is ON, and wherein the power transformer transfers energy obtained by magnetization of the power transformer to the output voltage when the primary side switch is OFF; wherein under a situation where the flyback power converter operates under boundary conduction mode (BCM), after the power transformer is demagnetized through turning ON the SR switch by the SR pulse and after the secondary side winding of the power transformer has finished demagnetization, the secondary side controller circuit subsequently keeps the SR switch ON by the SS pulse, so as to achieve soft switching of the primary side switch during a next cycle, wherein the SS pulse has a first ON period; or wherein under a situation where the flyback power converter operates under discontinuous conduction mode (DCM), after the power transformer is demagnetized through turning ON the SR switch by the SR pulse and after the secondary side winding of the power transformer has finished demagnetization, the secondary side controller circuit turns OFF the SR switch and subsequently turns ON the SR switch again by the SS pulse, so as to achieve soft switching of the primary side switch during a next cycle, wherein the SS pulse has a second ON period.

In one embodiment, the SS pulse retrieves a negative current from the output voltage through turning ON the secondary side winding, so as to achieve soft switching of the primary side switch during the next cycle.

In one embodiment, the secondary side controller circuit is configured to operably detect a voltage related to the SR switch, so as to detect whether the secondary side winding of the power transformer has finished demagnetization.

In one embodiment, the switching controller circuit further comprises: a signal shaping circuit, which is configured to operably shape the voltage related to the SR switch, wherein the thus shaped voltage related to the SR switch is supplied to the secondary side controller circuit, for detecting whether the secondary side winding of the power transformer has finished demagnetization.

In one embodiment, the primary side controller circuit is configured to operably detect a voltage related to the power transformer according to an auxiliary winding of the power transformer, so as to detect whether the secondary side winding of the power transformer has finished demagnetization.

In one embodiment, the switching controller circuit further comprises: a signal shaping circuit, which is configured to operably shape the voltage related to the power transformer, wherein the thus shaped voltage related to the power transformer is supplied to the primary side controller circuit, for detecting whether the secondary side winding of the power transformer has finished demagnetization.

In one embodiment, the primary side controller circuit is configured to operably generate a clock signal, so as to determine a highest switching frequency of the switching signal, wherein when the clock signal is generated before the secondary side winding of the power transformer has finished demagnetization, the primary side controller circuit turns ON the primary side switch after a first delayed period from the clock signal, and wherein when the clock signal is generated after the secondary side winding of the power transformer has finished demagnetization, the primary side controller circuit turns ON the primary side switch after a second delayed period from the clock signal; wherein within the first delayed period and the second delayed period, the primary side switch is forbidden to be turned ON.

In one embodiment, the secondary side controller circuit has a current threshold, wherein the secondary side controller circuit confirms whether the secondary side winding of the power transformer has finished demagnetization according to a current flowing through the SR switch and the current threshold, wherein the current threshold is a settable value.

In one embodiment, the first ON period is longer than the second ON period.

In one embodiment, the switching controller circuit further comprises: a signal transformer, which is configured to operably transmit the clock signal from the primary side controller circuit to the secondary side controller circuit.

In one embodiment, the first delayed period is longer than the second delayed period.

From another perspective, the present invention provides a method configured to operably control a flyback power converter, so as to convert an input voltage to an output voltage, wherein a power transformer of the flyback power converter is coupled between the input voltage and the output voltage in an isolated manner; the method comprising: generating a switching signal at a primary side of the flyback power converter, to control a primary side switch of the flyback power converter, thereby controlling the primary side winding of the power transformer, wherein the primary side winding is coupled to the input voltage; and generating a synchronous rectification (SR) signal at a secondary side of the flyback power converter, to control an SR switch of the flyback power converter, thereby controlling a secondary side winding of the power transformer, so as to generate the output voltage, wherein the SR signal includes an SR pulse and a soft switching (SS) pulse, wherein the SR pulse is configured to operably control the SR switch to be ON for an SR period, to achieve synchronous rectification at the secondary side, and wherein the SS pulse is configured to operably control the SR switch to be ON for an SS period, to achieve soft switching of the primary side switch; wherein the power transformer is magnetized when the primary side switch is ON, and wherein the power transformer transfers energy obtained by magnetization of the power transformer to the output voltage when the primary side switch is OFF; wherein under a situation where the flyback power converter operates under boundary conduction mode (BCM), after the power transformer is demagnetized through turning ON the SR switch by the SR pulse and after the secondary side winding of the power transformer has finished demagnetization, the SR switch is kept ON by the SS pulse, so as to achieve soft switching of the primary side switch during a next cycle, wherein the SS pulse has a first ON period; or wherein under a situation where the flyback power converter operates under discontinuous conduction mode (DCM), after the power transformer is demagnetized through turning ON the SR switch by the SR pulse and after the secondary side winding of the power transformer has finished demagnetization, the SR switch is turned OFF, and is subsequently turned ON by the SS pulse, so as to achieve soft switching of the primary side switch during a next cycle, wherein the SS pulse has a second ON period.

In one embodiment, the method further comprises: shaping the voltage related to the SR switch, so as to detect whether the secondary side winding of the power transformer has finished demagnetization.

In one embodiment, whether the secondary side winding of the power transformer has finished demagnetization is detected by a step including: detecting a voltage related to the power transformer via an auxiliary winding of the power transformer, so as to detect whether the secondary side winding of the power transformer has finished demagnetization.

In one embodiment, the method further comprises: shaping the voltage related to the power transformer, so as to detect whether the secondary side winding of the power transformer has finished demagnetization.

In one embodiment, the method further comprises: generating a clock signal at the primary side, so as to determine a highest switching frequency of the switching signal, wherein when the clock signal is generated before the secondary side winding of the power transformer has finished demagnetization, the primary side controller circuit turns ON the primary side switch after a first delayed period from the clock signal, and wherein when the clock signal is generated after the secondary side winding of the power transformer has finished demagnetization, the primary side controller circuit turns ON the primary side switch after a second delayed period from the clock signal; wherein within the first delayed period and the second delayed period, the primary side switch is forbidden to be turned ON.

In one embodiment, whether the secondary side winding of the power transformer has finished demagnetization is detected by a step including: confirming whether the secondary side winding of the power transformer has finished demagnetization according to a current flowing through the SR switch and the current threshold, wherein the current threshold is a settable value.

In one embodiment, the method further comprises: transmitting the clock signal from the primary side of the flyback power converter to the secondary side of the flyback power converter via a signal transformer.

In one embodiment, the first delayed period is longer than the second delayed period.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
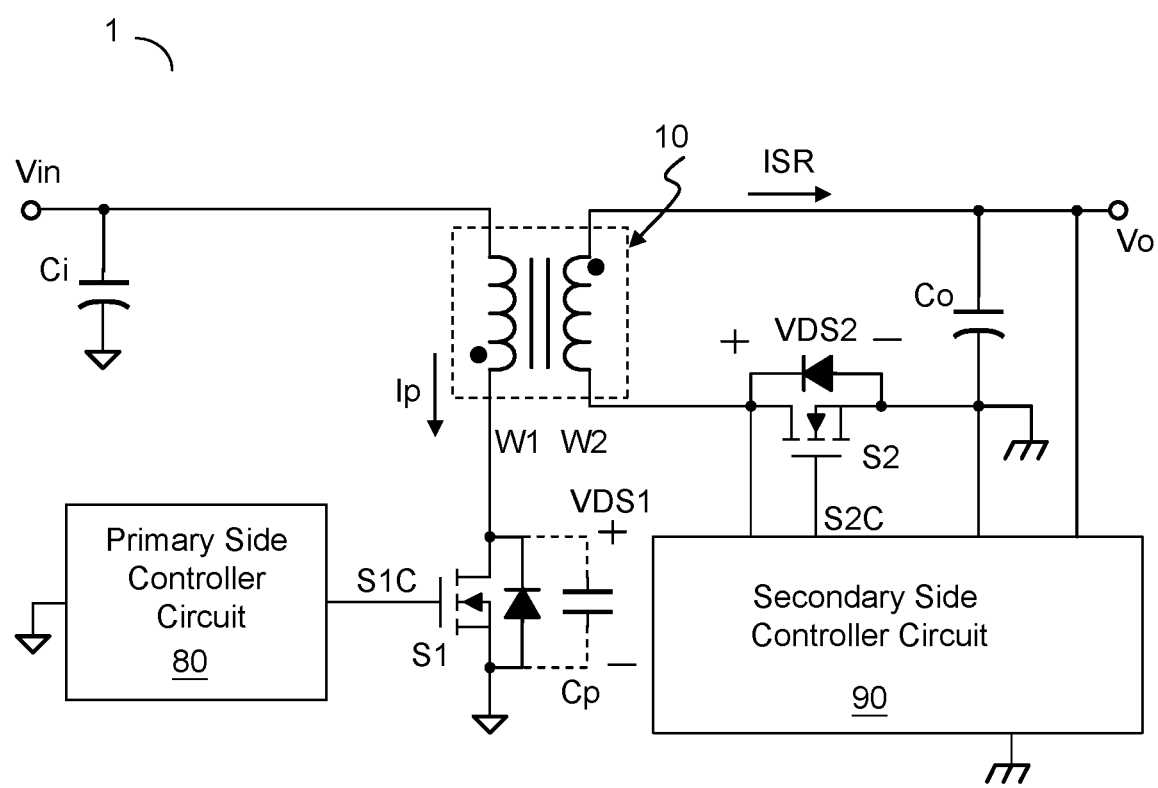
FIG. 1A shows a schematic diagram of a conventional flyback power converter.
Figure 1B:
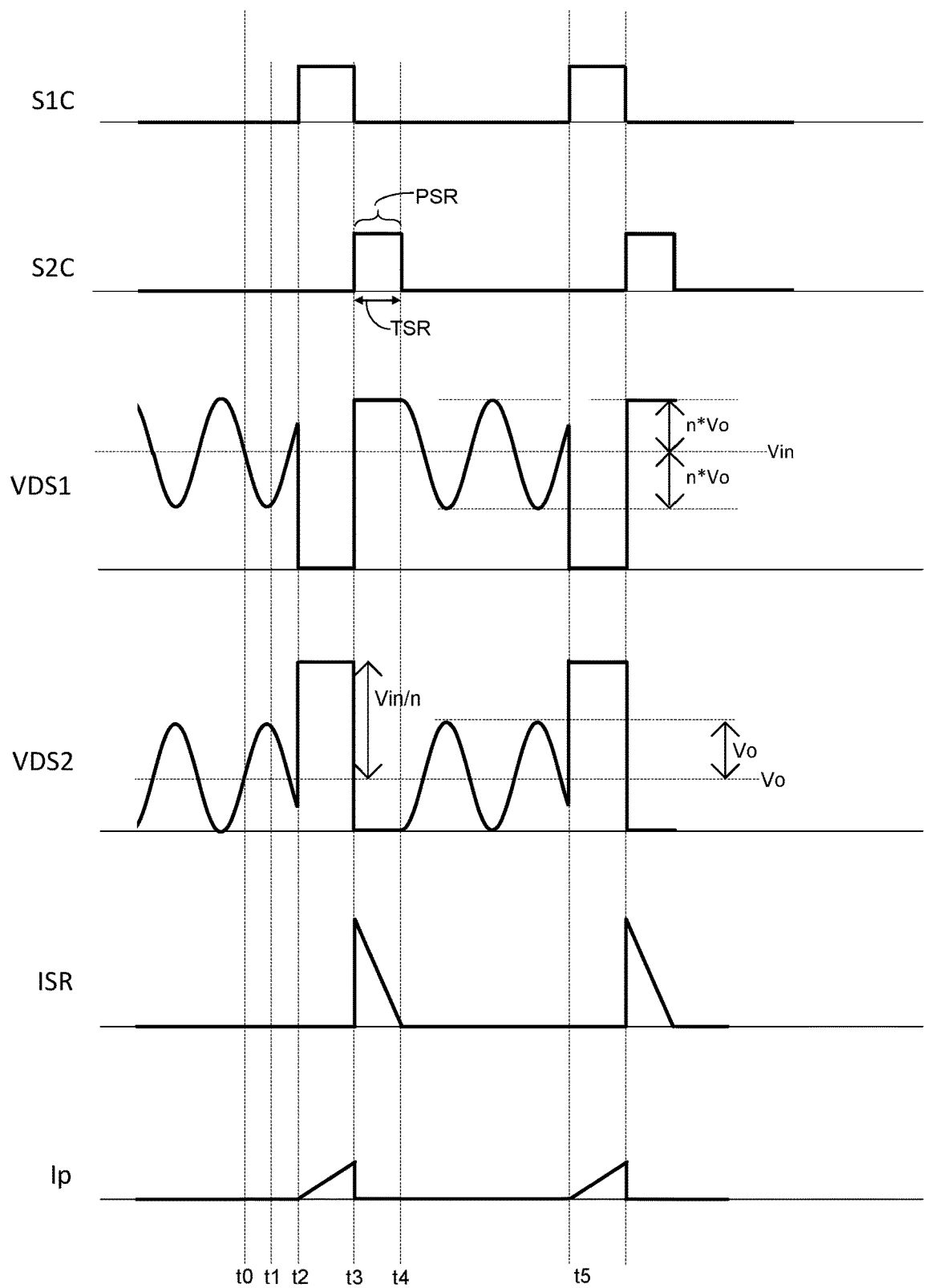
FIG. 1B illustrates a waveform diagram depicting the operation of a conventional flyback power converter of FIG. 1A.
Figure 2A:
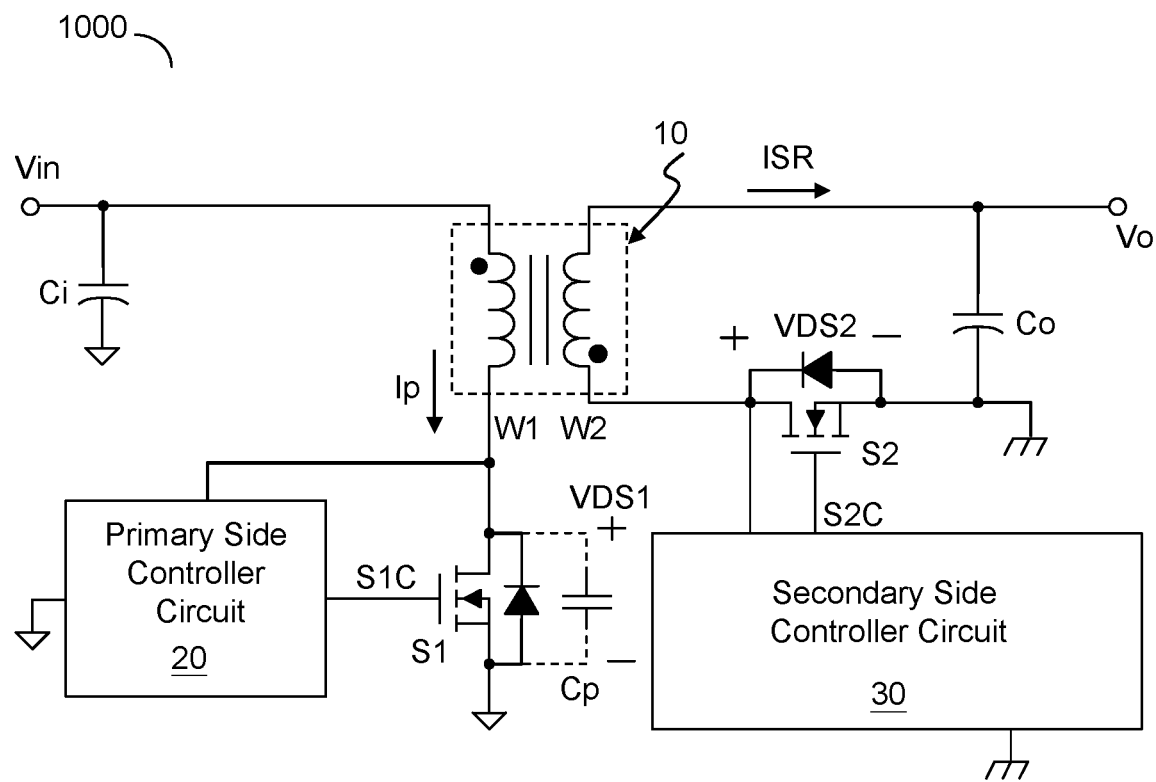
FIG. 2A shows a schematic diagram of a switching controller circuit according to an embodiment of the present invention.

Please refer to FIG. 2A, which shows a schematic diagram of a switching controller circuit (i.e., switching controller circuit 100) according to an embodiment of the present invention. As shown in FIG. 2A, the switching controller circuit 100 is configured to operably control a flyback power converter 1000, so as to convert an input voltage Vin to an output voltage Vo. The thus generated output voltage Vo is supplied as power to a load circuit (not shown; a load circuit is well known to those skilled in the art, so the details thereof are not redundantly explained here). The switching controller circuit 100 comprises: a power transformer 10, a primary side controller circuit 20 and a secondary side controller circuit 30.

Figure 2B:
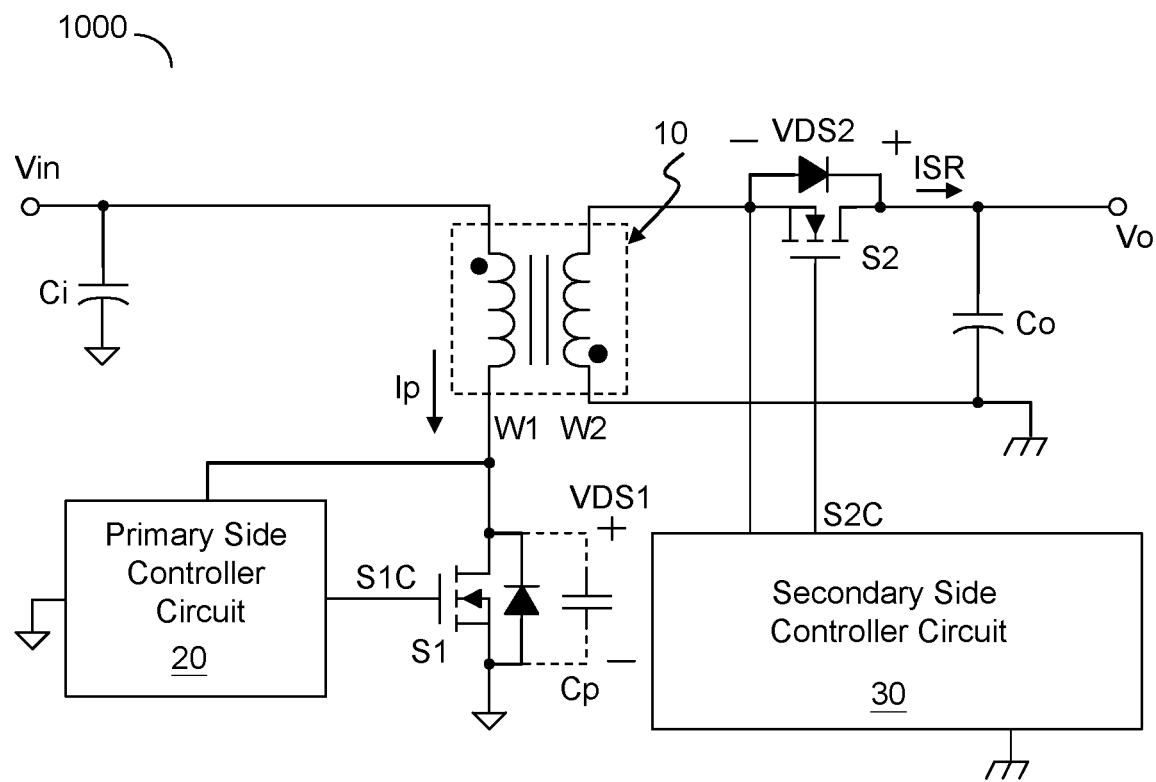
FIG. 2B shows a schematic diagram of a switching controller circuit according to another embodiment of the present invention.

The power transformer 10 is coupled between the input voltage Vin and the output voltage Vo in an isolated manner (i.e., the input voltage Vin and the output voltage Vo are isolated from each other and can have different ground levels). A primary side switch S1 is coupled to a primary side winding W1 of the power transformer 10. The primary side winding W1 is coupled to the input voltage Vin. The SR switch S2 and the secondary side winding W2 of the power transformer 10 are coupled in series to each other between the output voltage Vo and a secondary side ground node. In this embodiment, the SR switch S2 is coupled between the secondary side winding W2 of the power transformer 10 and the secondary side ground node. Referring to FIG. 2B, in another embodiment, the SR switch S2 can be coupled between the secondary side winding W2 of the power transformer 10 and the output voltage Vo. For simplicity in explaining the concepts of the present invention, the examples and explanations set forth hereinafter are given with reference to the implementation wherein the SR switch S2 is coupled between the secondary side winding W2 of the power transformer 10 and the secondary side ground node (i.e., the embodiment shown in FIG. 2A); however certainly, the present invention is also applicable to the implementation wherein the SR switch S2 is coupled between the secondary side winding W2 of the power transformer 10 and the output voltage Vo (i.e., the embodiment shown in FIG. 2B).

The primary side controller circuit 20 is configured to operably generate a switching signal S1C to operate the primary side switch S1, thereby controlling the primary side winding W1 of the power transformer 10. The secondary side controller circuit 30 is configured to operably generate a synchronous rectification (SR) signal S2C to operate the SR switch S2, thereby controlling the secondary side winding W2 of the power transformer 10, so as to generate output voltage Vo. Voltage VDS1 denotes a drain voltage of the primary side switch S1, whereas, voltage VDS2 denotes a voltage of a first end of the SR switch S2. In this embodiment, the first end of the SR switch S2 refers to a drain (i.e., a current output end) of the SR switch S2, and the second end of the SR switch S2 refers to a source (i.e., a current input end) of the SR switch S2. Note that, in the embodiment wherein the SR switch S2 is coupled between the secondary side winding W2 of the power transformer 10 and the output voltage Vo (i.e., the embodiment shown in FIG. 2B), the first end of the SR switch S2 refers to a source (i.e., a current input end) of the SR switch S2, and the second end of the SR switch S2 refers to a drain (i.e., a current output end) of the SR switch S2.

Figure 3:
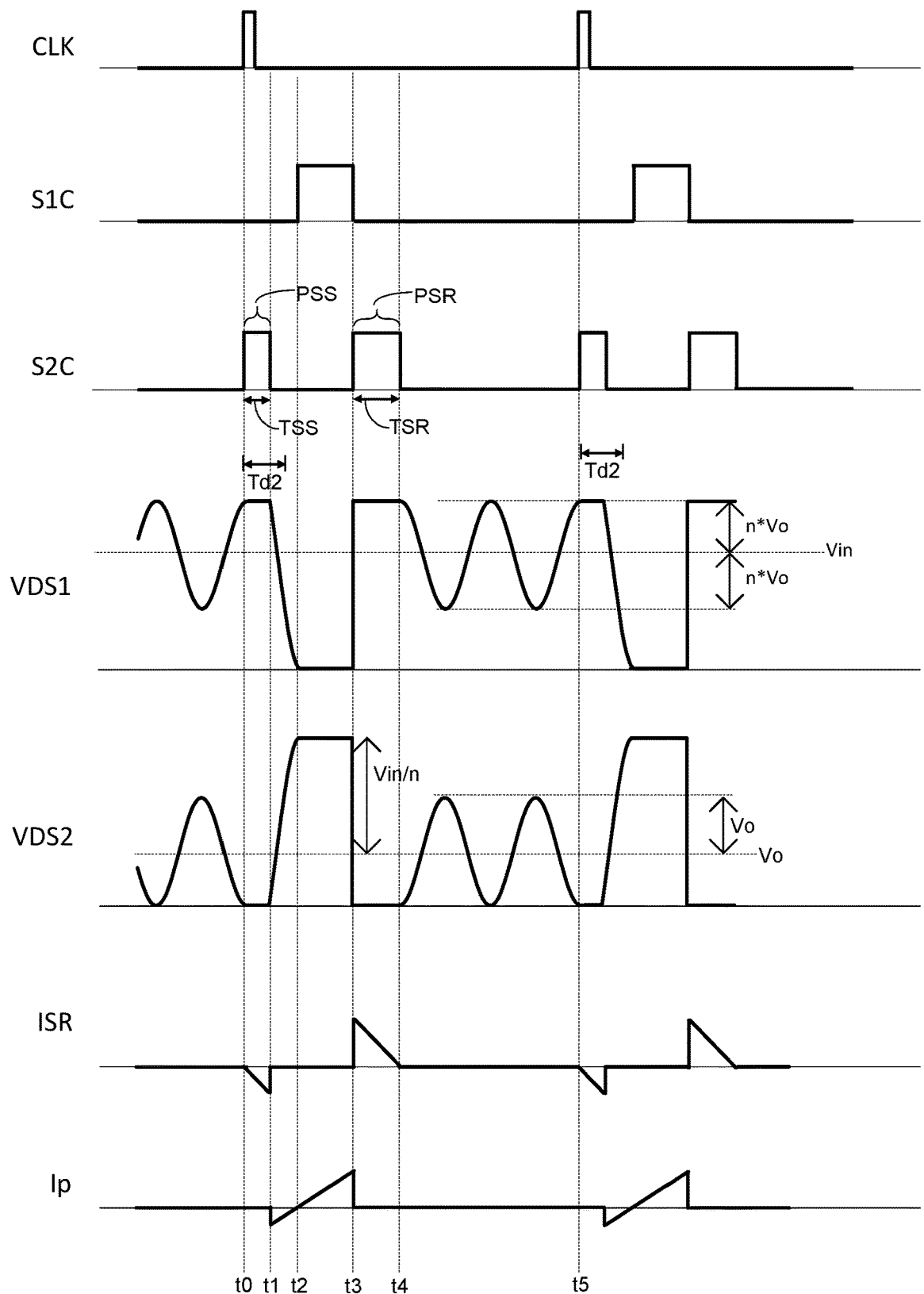
FIG. 3 illustrates a waveform diagram depicting the operation of a switching controller circuit of the present invention.

Please refer to FIG. 2 in conjugation with FIG. 3. FIG. 3 illustrates a waveform diagram depicting the operation of a switching controller circuit of the present invention. In this embodiment, the flyback power converter 1000 of the present invention operates under a discontinuous conduction mode (DCM). According to the present invention, the SR signal S2C includes an SR pulse PSR and a soft switching (SS) pulse PSS. After the primary side switch S1 has been turned ON and subsequently turned OFF (e.g., referring to the switching signal S1C and as shown by the time point t3 in FIG. 3), the SR pulse PSR controls the SR switch S2 to be ON for an SR period TSR, to achieve synchronous rectification at the secondary side, wherein the SR period TSR is substantially in synchronization with an ON period of a conduction current of the secondary side winding W2. In other words, the SR period TSR begins at the time point (i.e., the time point t3) when energy starts being transferred from the primary side winding W1 to the secondary side winding W2 to generate a secondary side current ISR, and the SR period TSR ends at the time point (i.e., the time point t4) when the secondary side current ISR of the secondary side winding W2 is reduced to zero, thus enhancing power conversion efficiency. As shown in FIG. 3, n denotes a turn ratio of the primary side winding W1 to the secondary side winding W2.

Please still refer to FIG. 3. On the other hand, the SS pulse is configured to achieve the above-mentioned soft switching of the primary side switch S1. More specifically, in this embodiment, when a load circuit connected to the flyback power converter 1000 is in a light load condition (i.e., the load condition is not greater than a predetermined load threshold) and the flyback power converter 1000 operates under DCM, the power transformer 10 is magnetized (e.g., referring to the period from the time point t2 to the time point t3 in FIG. 3) when the primary side switch S1 is ON, and the power transformer 10 transfers the energy stored by the magnetization of the power transformer 10 to the output voltage Vo when the primary side switch S1 is OFF. After the SR pulse PSR turns ON the SR switch S2 to demagnetize the secondary winding W2 of the power transformer 10 (e.g., referring to the time point t4 in FIG. 3), the SR switch S2 is turned OFF (e.g., referring to the period from the time point t4 to the time point t5 in FIG. 3). And when the SR switch S2 is again turned ON according to the SS pulse PSS (e.g., referring to the time point t0 or t5 in FIG. 3), the power transformer 10 will conduct a negative direction secondary side current ISR at the secondary side winding W2. That is, as shown in FIG. 3, during the SS period TSS (i.e., from the time point t0 to the time point t1), when the secondary side current ISR is negative, the secondary side current ISR will transfer energy from an output capacitor Co to the secondary side winding W2. That is, the SS pulse PSS can retrieve a negative current (i.e., the negative secondary side current ISR) from the output voltage Vo by conducting the secondary winding W2, to thereby transfer energy from the output capacitor Co to the secondary side winding W2. When the SR switch S2 is again OFF at the time point when the SS pulse PSS ends (e.g., at t1), as shown in FIG. 3, the power transformer 10 will conduct a negative direction primary side current Ip at the primary side winding W1. During this period (i.e., from the time point t1 to the time point t2), the negative primary side current Ip can discharge a parasitic capacitor Cp of the primary side switch S1, such that the drain voltage VDS1 of the primary side switch S1 is reduced to a lower level, and the charges are stored back to an input capacitor Ci via the primary winding W1. Thus, when the primary side switch S1 is subsequently ON, soft switching (SS) is achieved. In one embodiment, preferably, the negative primary side current Ip is configured to discharge the parasitic capacitor Cp of the primary side switch S1 to substantially 0V, so that the primary side switch S1 achieves zero voltage switching (ZVS).

Note that the term "load condition", as may be used herein, is meant to indicate the power consumption of a load circuit. In other words, if the power of the load circuit is supplied from the output voltage Vo, the term "load condition" indicates how much the load circuit consumes this power. The term "light load condition" means a relatively lighter power consumption and the term "heavy load condition" means a relatively heavier power consumption, and whether it is light load condition or heavy load condition is differentiated according to a predetermined load threshold, which can be set differently depending upon different design parameters (e.g., input voltage, output voltage, or inductance of the transformer, etc.) for different flyback power converters. For example, heavy load condition can be defined as a situation wherein the required output power is greater than a predetermined load threshold, and in this case the flyback power converter operates under BCM; in contrast, light load condition can be defined as a situation wherein the required output power is not greater than another or the same predetermined load threshold, and in this case the flyback power converter operates under DCM. Or, in another embodiment, light load condition and heavy load condition can be differentiated according to an output current which is related to the output power, which is well known to those skilled in the art, so the details thereof are not redundantly explained here.

Additionally, as one of average skill in the art will readily understand, the term "soft switching (SS)" refers to: before a transistor (e.g., corresponding to the primary side switch S1) is about to be turned ON, the residue voltage in the parasitic capacitor of this transistor is discharged to a low level by a discharging current through a discharging path having low or no power loss (e.g., corresponding to the primary side winding W1) and the charges are stored back to a device having low or no power loss (e.g., the input capacitor Ci). As a consequence, when it is time for the transistor to be turned ON, the drain-source voltage of the transistor has been reduced to a low voltage. Because the parasitic capacitor Cp of this transistor is not discharged through the conduction resistance of the transistor, the power conversion efficiency is enhanced.

Note that, although it is preferred for the parasitic capacitor to be discharged to 0V, however due to non-idealities caused by for example imperfection of components or imperfect matching among components, the voltage of the parasitic capacitor may not be discharged exactly to 0V, but just close to 0V. In other words, according to the present invention, a certain level of error between 0V and the voltage on the parasitic capacitor after discharge is acceptable, and therefore the term "substantially" is used to mean that an insignificant error within a tolerable range is acceptable. It is noted here that whenever the term "substantially" is used in this specification, it means that an insignificant error within a tolerable range is acceptable.

Figure 4:
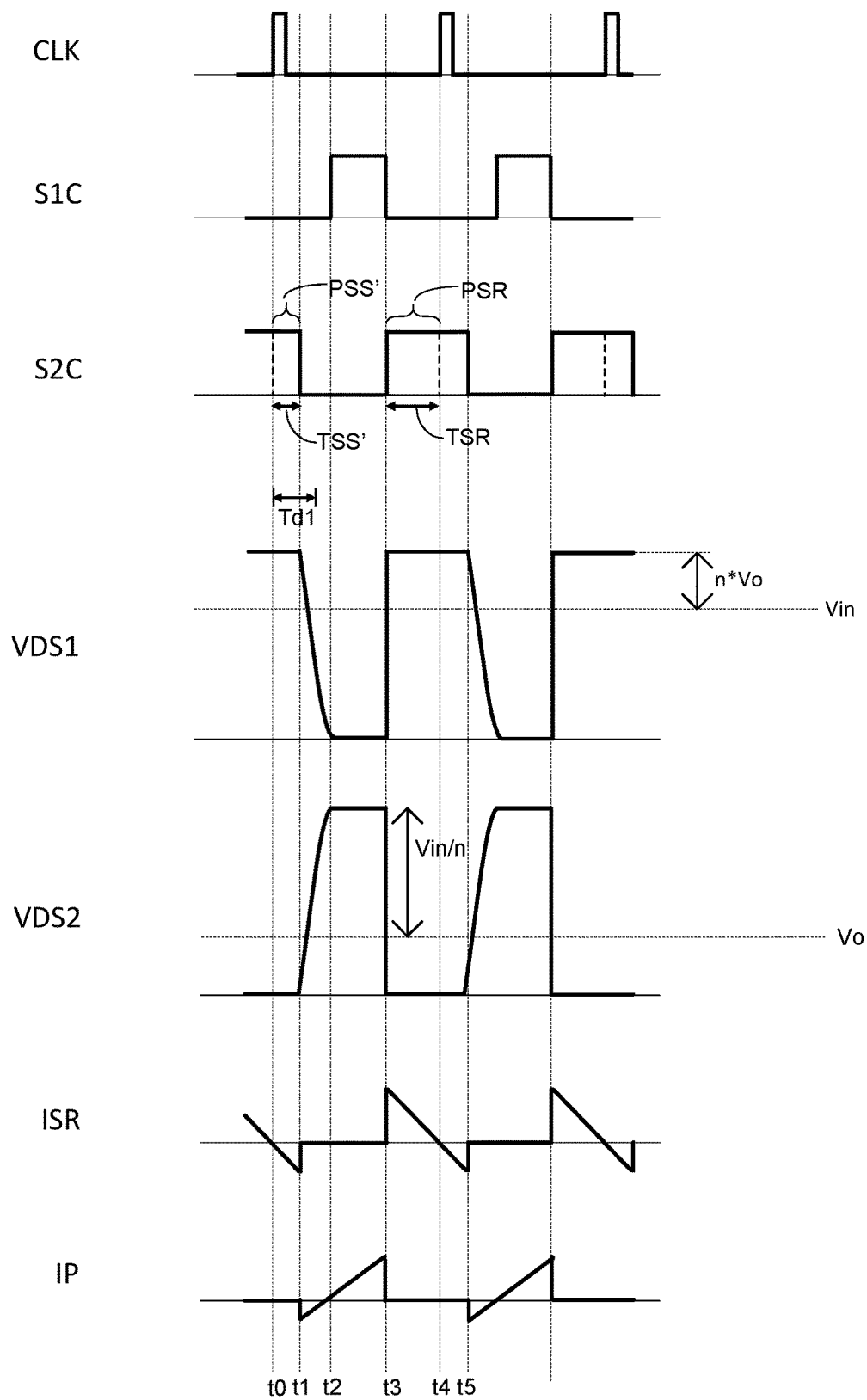
FIG. 4 illustrates a waveform diagram depicting the operation of a flyback power converter of the present invention.

Please refer to FIG. 4, which illustrates a waveform diagram depicting the operation of a flyback power converter of the present invention. In this embodiment, the flyback power converter 1000 operates under BCM. This embodiment is similar to the embodiment of FIG. 3, but is different in that: the SR pulse PSR (e.g., from the time point t3 to the time point t4) and the SS pulse PSS' (e.g., from the time point t4 to the time point t5) of the SR signal S2C are connected to each other to form one continuous pulse; or, the SR period TSR (corresponding to the SR pulse PSR) and the SS period TSS' (corresponding to the SS pulse PSS') are connected to each other to form one continuous period. As shown in FIG. 4, when the SR pulse PSR ends (which is when the SR period TSR ends; referring to the time point t4 in FIG. 4, at this time point the secondary side current ISR is reduced to zero), the SS pulse PSS' immediately starts. That is, in this embodiment, during a period wherein the primary side switch S1 is OFF, the waveform of the ON period of the SR signal S2C appears to be only one single pulse. Note that, in one preferred embodiment, during the SR period TSR (e.g., from the time point t3 to the time point t4), the secondary side current ISR is positive (that is, the current flows to the output, which is the positive direction), whereas, during the SS period TSS' (e.g., from the time point t4 to the time point t5), at least part of the secondary side current ISR is negative (i.e., the current flows back from the output, which is the positive direction).

In one embodiment, the SS period TSS' of the SS pulse PSS' under BCM is longer than the SS period TSS of the SS pulse PSS under DCM.

The switching controller circuit of the present invention can detect whether the secondary side winding w2 of the power transformer 10 has finished demagnetization via various ways. In one embodiment, the secondary side controller circuit 30 can detect a voltage related to the SR switch S2, so as to detect whether the secondary side winding of the power transformer has finished demagnetization (i.e., whether the secondary side current ISR has dropped to zero). Please refer to FIG. 5, which illustrates more specific details of a waveform diagram corresponding to the embodiment of FIG. 3. As an example, the secondary side controller circuit 30 can detect a drain voltage VDS2 of the SR switch S2. When the secondary side current ISR is positive and the SR switch S2 is ON according to the SR pulse PSR, the drain voltage VDS2 of the SR switch S2 should be negative (e.g., referring to the period from the time point t3 to the time point t4 in FIG. 5). Therefore, when the secondary side winding W2 of the power transformer 10 has finished demagnetization (i.e., when the secondary side current ISR has dropped from a positive level to zero), the secondary side controller circuit 30 can detect whether the drain voltage VDS2 of the SR switch S2 rises from a negative level to zero, so as to determine whether the secondary side winding W2 of the power transformer 10 has finished demagnetization. Note that, "detecting whether the secondary side winding W2 of the power transformer 10 has finished demagnetization", as may be used herein, is meant to indicate a concept to determine an ending time point of demagnetization (i.e., a time point when the secondary side current ISR reaches to zero) according to relevant parameters. What is to be detected can be any relevant parameter and is not limited to "demagnetization" itself. For simplicity, it is conceptually described as "detecting that the secondary side winding W2 of the power transformer 10 has finished demagnetization".

Figure 5:
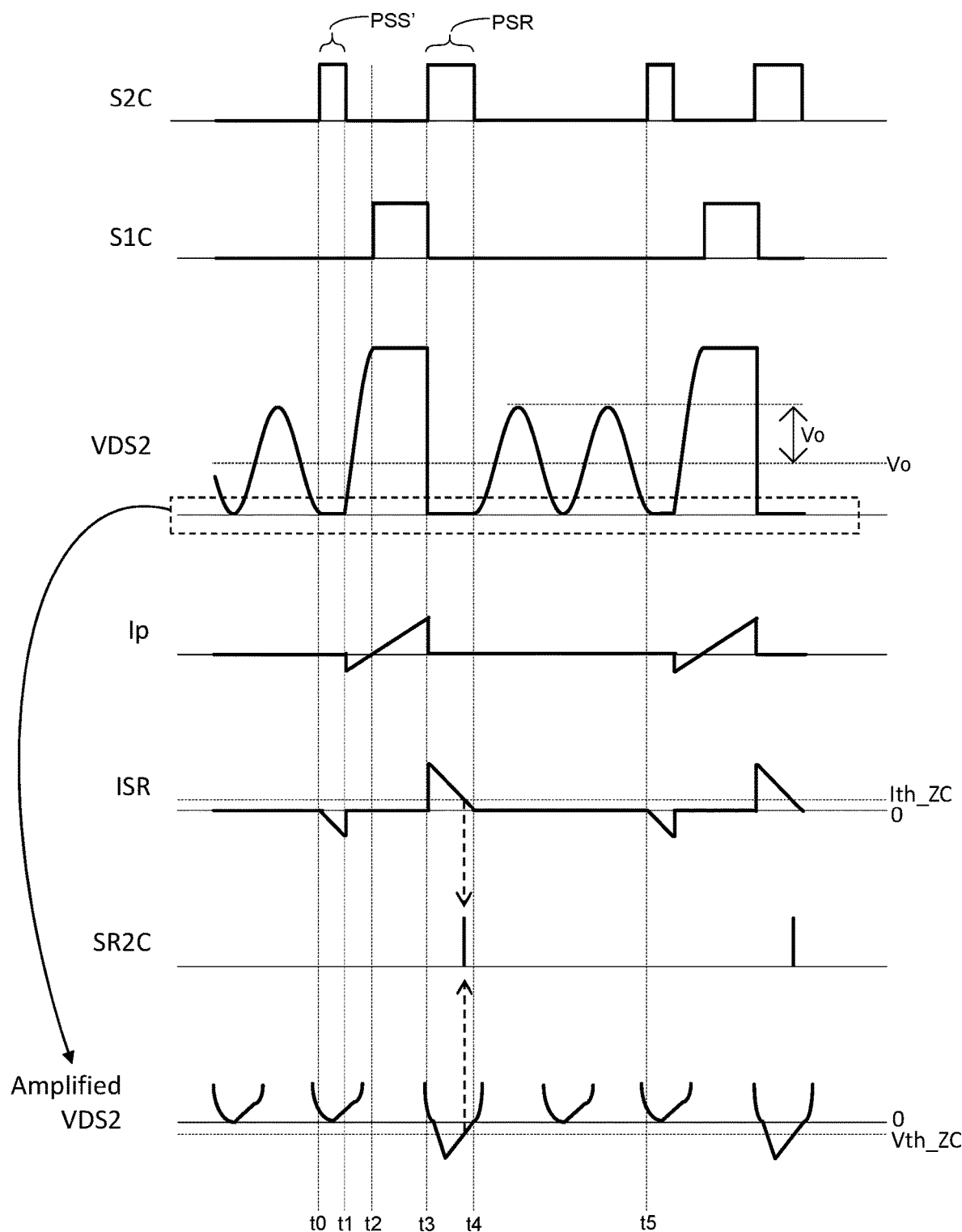
FIG. 5 illustrates more specific details of the waveform diagram of FIG. 3.
Figure 6A:
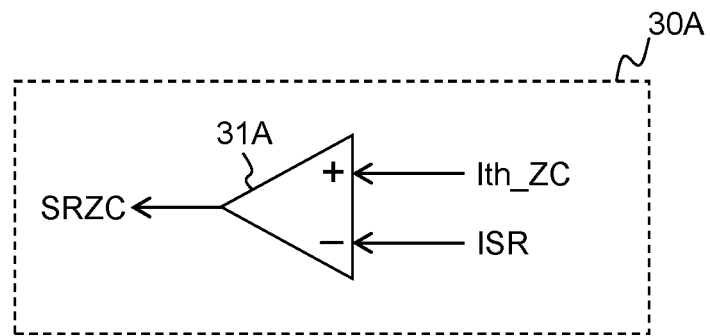
FIG. 6A and FIG. 6B shows two embodiment of a secondary side controller circuit of the present invention, respectively.
Figure 6B:
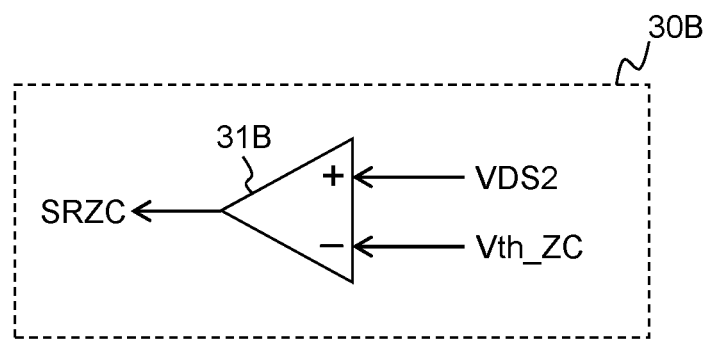

Please refer to FIG. 5 along with FIG. 6A and FIG. 6B. FIG. 6A and FIG. 6B shows two embodiments of a secondary side controller circuit (i.e., secondary side controller circuits 30A and 30B) according to the present invention, respectively.

As shown in FIG. 6A, in one embodiment, the secondary side controller circuit 30A includes a current comparator 31A. The current comparator 31A is configured to operably compare the secondary side current ISR with a current threshold Ith_ZC, so as to generate a signal SRZC indicative of whether a level of the secondary side current ISR is zero, that is, whether the secondary side winding W2 of the power transformer 10 has finished demagnetization. In one embodiment, the current threshold Ith_ZC can be a settable value. In more detail, the current threshold Ith_ZC can be set to a value substantially equal to zero. In one embodiment, the current threshold Ith_ZC can be set set to a value close to but greater than zero.

As shown in FIG. 6B, in one embodiment, the secondary side controller circuit 30B includes a voltage comparator 31B. The voltage comparator 31B is configured to operably compare a signal related to a secondary side current ISR with a current threshold Vth_ZC, so as to generate a signal SRZC indicative of whether a level of the secondary side current ISR is zero. The signal related to a secondary side current ISR can be, for example but not limited to, the above-mentioned drain voltage VDS2 of the SR switch S2. In one embodiment, the current threshold Vth_ZC can be a settable value. In more detail, the current threshold Vth_ZC can be set to a value substantially equal to zero. In one embodiment, the current threshold Ith_ZC can be set to a value close to but smaller than zero.

Figure 7:
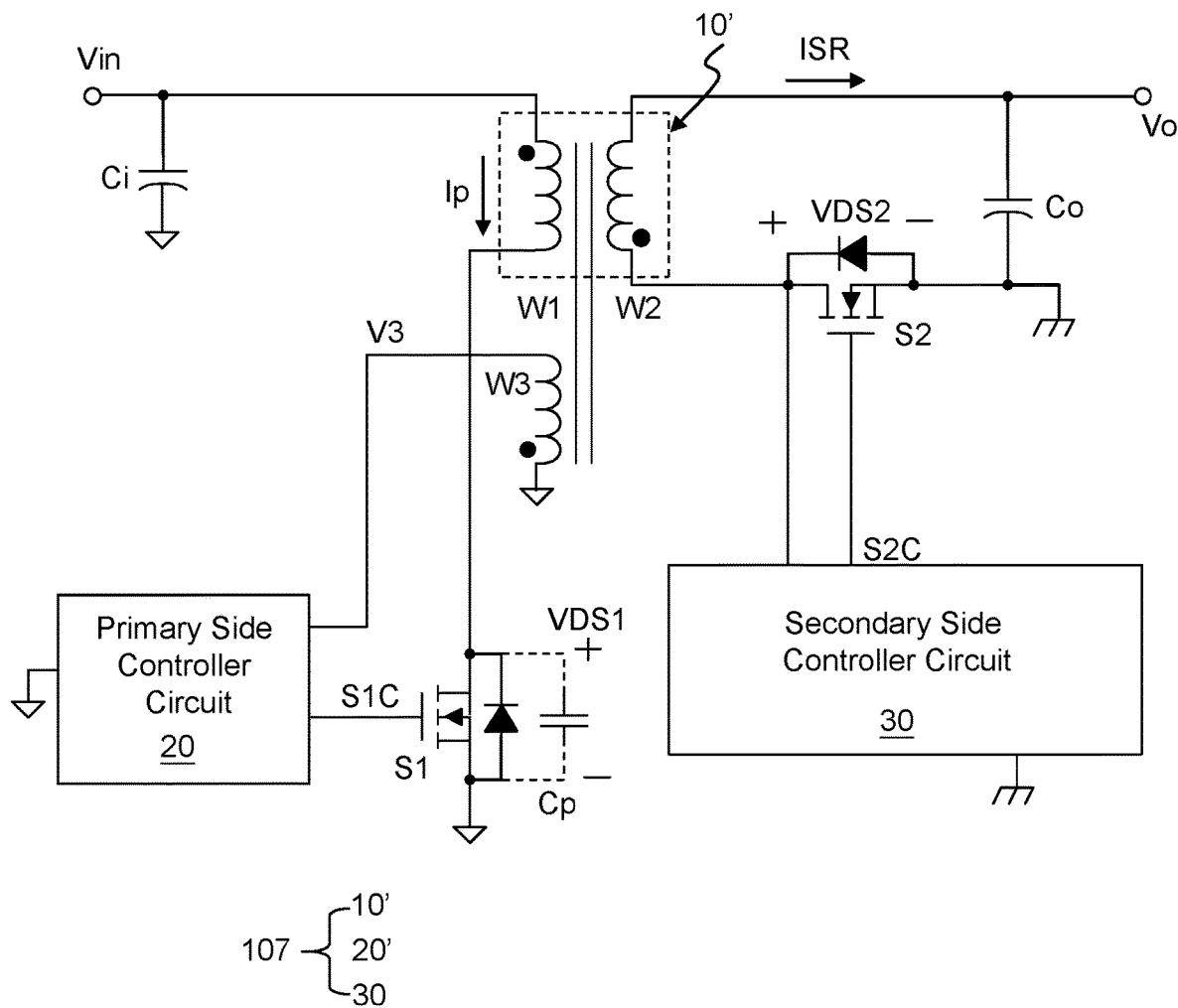
FIG. 7 shows an embodiment of a switching controller circuit of the present invention.

In another embodiment, it is practicable to use the primary side controller circuit to detect whether the secondary side winding of the power transformer has finished demagnetization. Please refer to FIG. 7, which shows an embodiment of a switching controller circuit (i.e., switching controller circuit 107) according to the present invention. In this embodiment, the primary side controller circuit 20' can detect the voltage related to the power transformer 10' via an auxiliary winding W3 of the power transformer 10', so as to detect whether the secondary side winding W2 of the power transformer 10' has finished demagnetization (i.e., the secondary side current ISR has reached to zero). In another embodiment, the primary side controller circuit 20' can detect the drain voltage VDS1 of the primary side switch S1, so as to detect the voltage related to the power transformer 10', to thereby detect whether the secondary side winding W2 of the power transformer 10' has finished demagnetization (i.e., the secondary side current ISR has reached to zero).

Please still refer to FIG. 3 and FIG. 4. In one embodiment, in the switching controller circuit of the present invention, the primary side controller circuit 20 is configured to operably generate a clock signal CLK, so as to determine a highest switching frequency of the switching signal S1C. As shown in FIG. 4, when a clock signal CLK is generated before the secondary side winding W2 of the power transformer 10 has finished demagnetization (i.e., when the clock signal CLK is generated before the secondary side current ISR has reached to zero), the primary side controller circuit 20 turns ON the primary side switch S1 after a delayed period Td1 from the clock signal CLK. More specifically, in this embodiment, because the load condition is relatively heavier, the clock signal CLK is generated before the secondary side winding W2 of the power transformer 10 has finished demagnetization (i.e., the clock signal CLK is generated before the secondary side current ISR has reached to zero). According to the present invention, in one embodiment, the clock signal CLK is used to trigger the SS pulse PSS' (e.g., referring to the period from the time point t4 to the time point t5 in FIG. 4), so that the SS pulse PSS' will follow right after the SR pulse PSR. At the same time, the clock signal CLK also triggers the delayed period Td1. Because the delayed period Td1 partially overlaps with the SS pulse PSS', the switching signal S1C is disabled during the delayed period Td1. In other words, the primary side switch S1 is forbidden to be turned ON during the delayed period Td1, so as to prevent the primary side switch S1 and the SR switch S2 to be ON concurrently.

Please still refer to FIG. 3. In another embodiment, when the clock signal CLK is generated after the secondary side winding W2 of the power transformer 10 has finished demagnetization (i.e., when the clock signal CLK is generated after the secondary side current ISR has reached to zero), the primary side controller circuit 20 turns ON the primary side switch S1 after a delayed period Td2 from the clock signal CLK. More specifically, in this embodiment, because the load condition is relatively lighter, the clock signal CLK is generated after the secondary side winding W2 of the power transformer 10 has finished demagnetization (i.e., the clock signal CLK is generated after the secondary side current ISR has reached to zero). According to the present invention, in one embodiment, the clock signal CLK triggers the SS pulse PSS (e.g., referring to the period from the time point t0 to the time point t1 in FIG. 3), and at the same time the clock signal CLK also triggers the delayed period Td2. The switching signal S1C is disabled during the delayed period Td2. In other words, the primary side switch S1 is forbidden to be turned ON during the delayed period Td2, so as to prevent the primary side switch S1 and the SR switch S2 to be ON concurrently.

In one embodiment, the above-mentioned delayed period Td1 is longer than the above-mentioned delayed period Td2

In one embodiment, the clock signal CLK is generated by the primary side controller circuit 20.

Figure 8:
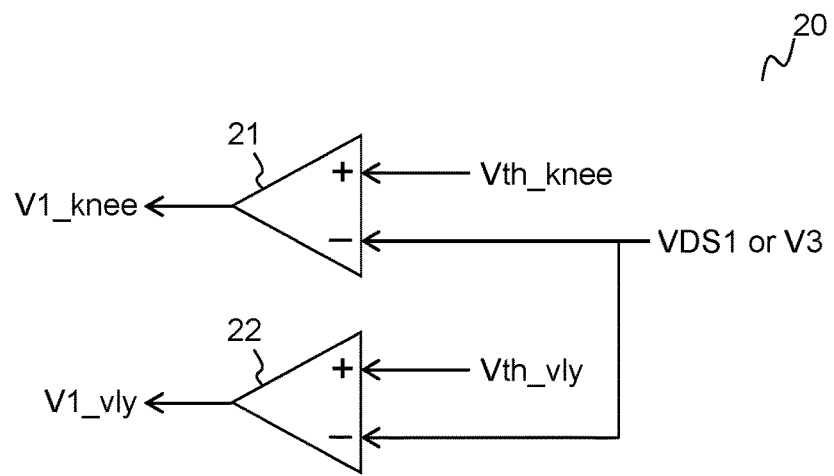
FIG. 8 shows an embodiment of a primary side controller circuit of the present invention.
Figure 9:
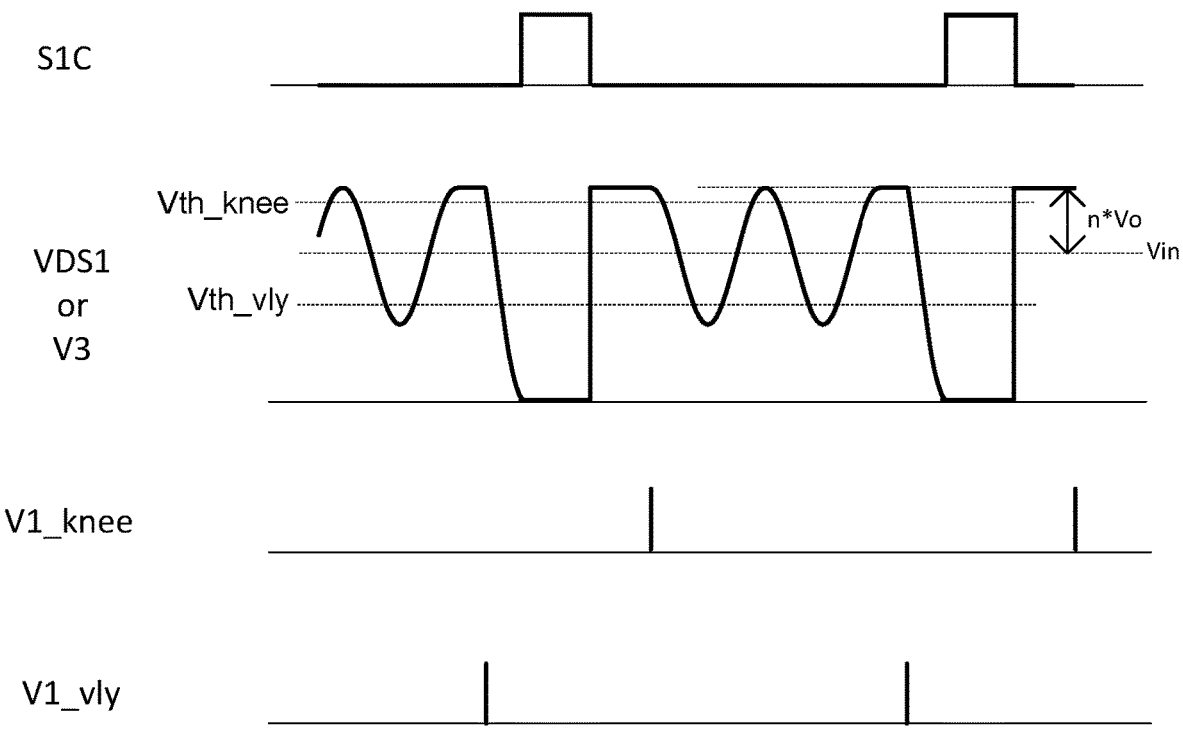
FIG. 9 illustrates a waveform diagram depicting the operation of a switching controller circuit of the present invention.

Please refer to FIG. 8 in conjugation with FIG. 9. FIG. 8 shows an embodiment of a primary side controller circuit (i.e., primary side controller circuit 20) according to the present invention. FIG. 9 illustrates a waveform diagram depicting the operation of a switching controller circuit of the present invention. In one embodiment, the primary side controller circuit 20 can determine whether the secondary side winding W2 of the power transformer 10 has finished demagnetization (i.e., determining a time point when the secondary side current ISR has reached to zero, which is the ending time point of demagnetization) according to whether the drain voltage VDS1 of the primary side switch S1 drops lower than a knee threshold Vth_knee. More specifically, as shown in FIG. 8 and FIG. 9, in one embodiment, a comparator 21 is configured to operably compare the drain voltage VDS1 of the primary side switch S1 with a knee threshold Vth_knee, so as to generate a knee signal V1_knee. The knee signal V1_knee is indicative of whether the drain voltage VDS1 of the primary side switch S1 is lower than the knee threshold Vth_knee. In another embodiment, the primary side controller circuit 20 can determine whether the secondary side winding W2 of the power transformer 10 has finished demagnetization (i.e., determining a time point when the secondary side current ISR has reached to zero) according to whether a voltage V3 of the auxiliary winding W3 drops lower than a knee threshold Vth_knee. More specifically, as shown in FIG. 8 and FIG. 9, in one embodiment, a comparator 21 is configured to operably compare the voltage V3 of the auxiliary winding W3 with a knee threshold Vth_knee, so as to generate a knee signal V1_knee. The knee signal V1_knee is indicative of whether the voltage V3 of the auxiliary winding W3 is lower than the knee threshold Vth_knee.

Please still refer to FIG. 8 and FIG. 9. In one embodiment, as shown in FIG. 8 and FIG. 9, the primary side controller circuit 20 can determine whether the drain voltage VDS1 of the primary side switch S1 is at a valley according to whether the drain voltage VDS1 of the primary side switch S1 drops lower than a valley threshold Vth_vly. More specifically, as shown in FIG. 8 and FIG. 9, in one embodiment, a comparator 22 is configured to operably compare the drain voltage VDS1 of the primary side switch S1 with a valley threshold Vth_vly, so as to generate a valley signal V1_vly. The valley signal V1_vly is indicative of whether the drain voltage VDS1 of the primary side switch S1 is at a valley. In another embodiment, the primary side controller circuit 20 can determine whether the voltage V3 of the auxiliary winding W3 is at a valley according to whether the voltage V3 of the auxiliary winding W3 drops lower than a valley threshold Vth_vly. More specifically, as shown in FIG. 8 and FIG. 9, in one embodiment, a comparator 22 is configured to operably compare the voltage V3 of the auxiliary winding W3 with a valley threshold Vth_vly, so as to generate a valley signal V1_vly. The valley signal V1_vly is indicative of whether the voltage V3 of the auxiliary winding W3 is at a valley. In one embodiment, preferably, the determination of the turned-ON time point of the primary side switch S1 is made only after the above-mentioned delayed period Td1 and/or Td2, that is, the turned-ON time point of the primary side switch S1 is determined according to whether the drain voltage VDS1 of the primary side switch S1 is close to zero only after the period Td1 and/or Td2.

Figure 10:
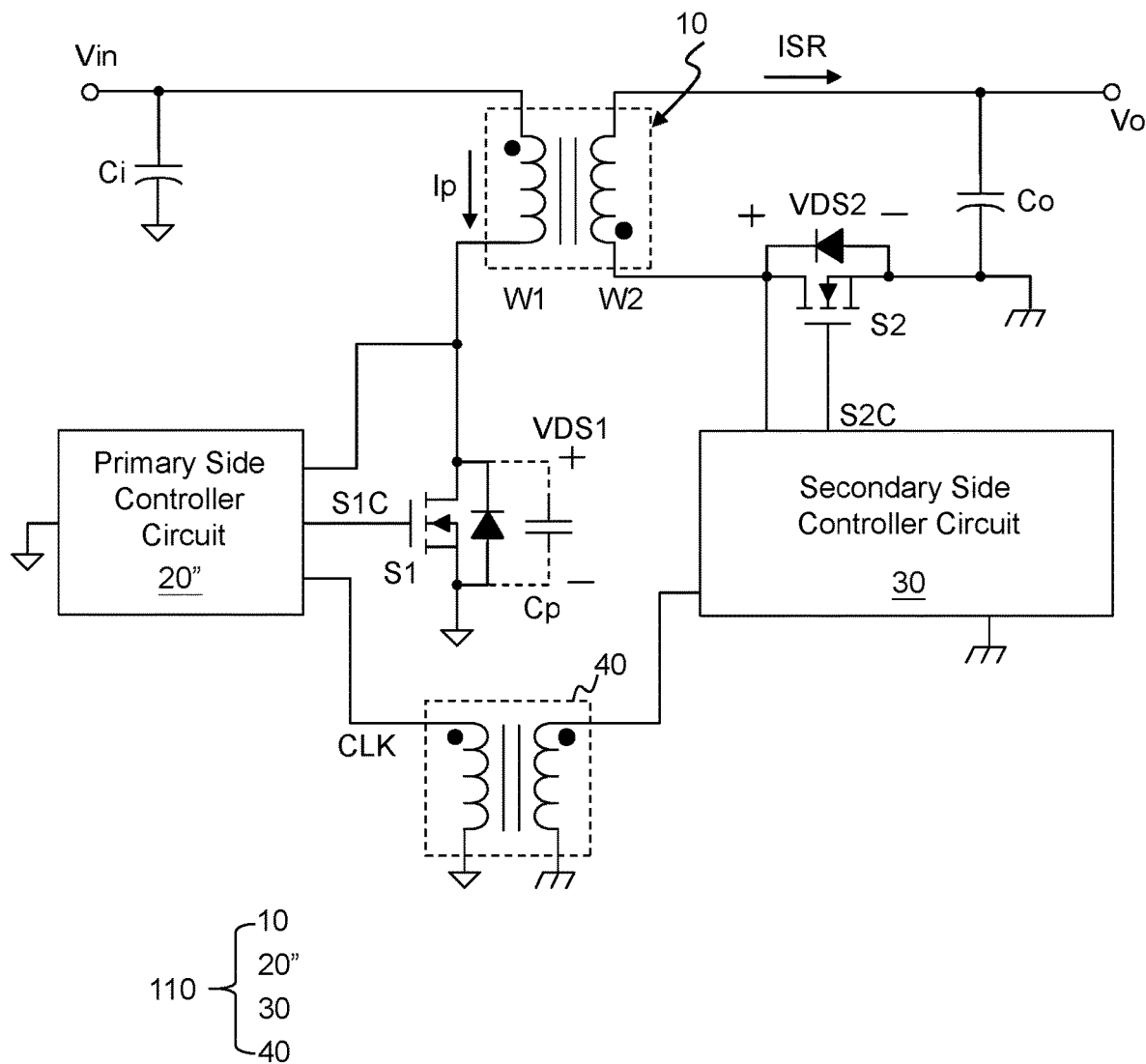
FIG. 10 shows another embodiment of a switching controller circuit of the present invention.

Please refer to FIG. 10, which shows another embodiment of a switching controller circuit (i.e., switching controller circuit 110) according to the present invention. This embodiment is similar to the above-mentioned embodiments, but is different in that: in this embodiment, the switching controller circuit 110 further comprises a signal transformer 40. The signal transformer 40 is configured to operably transmit the clock signal CLK from the primary side controller circuit 20″ to the secondary side controller circuit 30, so as to synchronously trigger the above-mentioned SS pulse PSS or PSS'.

Figure 11:
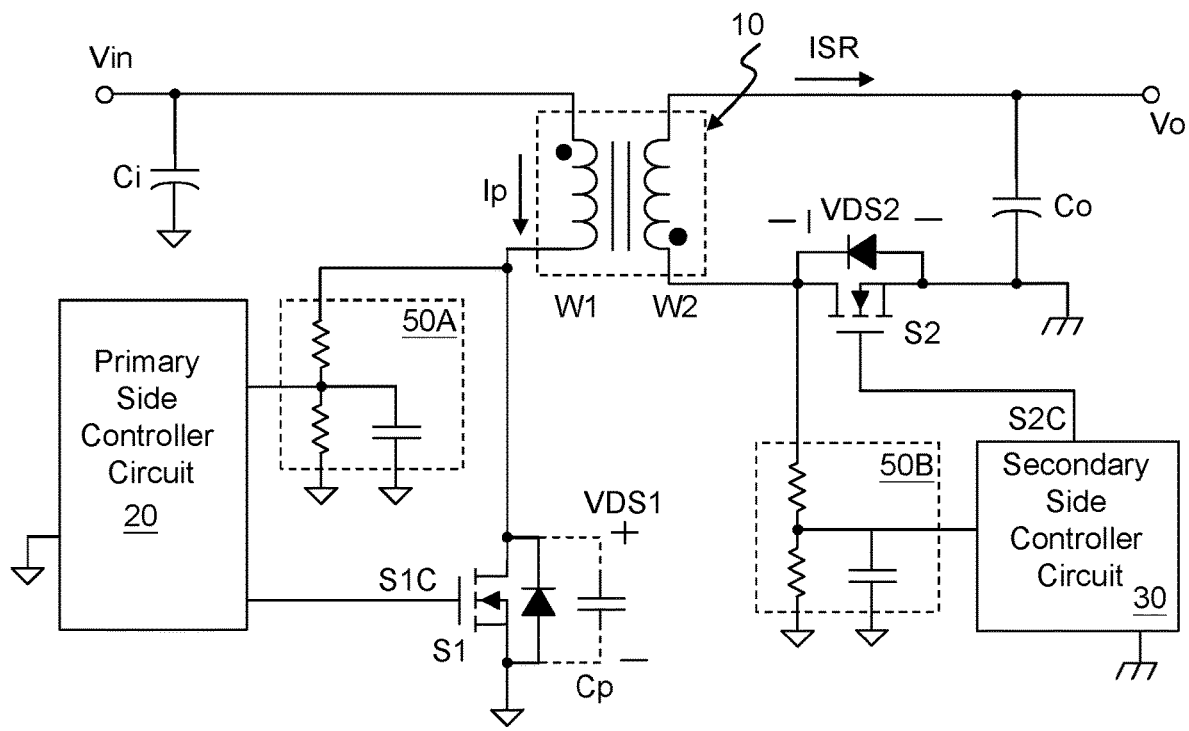
FIG. 11 shows an embodiment of a switching controller circuit and an embodiment of a signal shaping circuit in a switching controller circuit according to the present invention.

Please refer to FIG. 11, which shows an embodiment of a switching controller circuit (i.e., switching controller circuit 111) and an embodiment of a signal shaping circuit (i.e., signal shaping circuit 50A or 50B) in a switching controller circuit. As shown in FIG. 11, this embodiment is similar to the above-mentioned embodiments, but is different in that: in this embodiment, the switching controller circuit 111 further comprises a signal shaping circuit (e.g., signal shaping circuit 50A or 50B). In one embodiment, the signal shaping circuit 50A is configured to operably process the drain voltage VDS1 of the primary side switch S1, and subsequently transmit the processed drain voltage VDS1 of the primary side switch S1 to the primary side controller circuit 20. In one embodiment, the signal shaping circuit 50B is configured to operably process the drain voltage VDS2 of the SR switch S2, and subsequently transmit the processed drain voltage VDS2 of the SR switch S2 to the secondary side controller circuit 30.

As shown in FIG. 11, in one embodiment, the signal shaping circuit (e.g., corresponding to the above-mentioned signal shaping circuit 50A or 50B) includes a voltage divider circuit (e.g., voltage divider resistors as shown in FIG. 11) and a filter circuit (e.g., filter capacitor as shown in FIG. 11). The filter circuit is configured to operably filter noise.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching controller circuit, which is configured to operably control a flyback power converter, so as to convert an input voltage to an output voltage; the switching controller circuit comprising:

a power transformer, which is coupled between the input voltage and the output voltage in an isolated manner;

a primary side controller circuit, which is configured to operably generate a switching signal, to control a primary side switch of the flyback power converter, thereby controlling the primary side winding of the power transformer, wherein the primary side winding is coupled to the input voltage; and a secondary side controller circuit, which is configured to operably generate a synchronous rectification (SR) signal, to control an SR switch of the flyback power converter, thereby controlling a secondary side winding of the power transformer, so as to generate the output voltage, wherein the SR signal includes an SR pulse and a soft switching (SS) pulse, wherein the SR pulse is configured to operably control the SR switch to be ON for an SR period, to achieve synchronous rectification at the secondary side, and wherein the SS pulse is configured to operably control the SR switch to be ON for an SS period, thereby achieving soft switching of the primary side switch;

wherein the power transformer is magnetized when the primary side switch is ON, and wherein the power transformer transfers energy obtained by magnetization of the power transformer to the output voltage when the primary side switch is OFF;

wherein under a situation where the flyback power converter operates under boundary conduction mode (BCM), after the power transformer is demagnetized through turning ON the SR switch by the SR pulse and after the secondary side winding of the power transformer has finished demagnetization, the secondary side controller circuit subsequently keeps the SR switch ON by the SS pulse, so as to achieve soft switching of the primary side switch during a next cycle, wherein the SS pulse has a first ON period; or wherein under a situation where the flyback power converter operates under discontinuous conduction mode (DCM), after the power transformer is demagnetized through turning ON the SR switch by the SR pulse and after the secondary side winding of the power transformer has finished demagnetization, the secondary side controller circuit turns OFF the SR switch and subsequently turns ON the SR switch again by the SS pulse, so as to achieve soft switching of the primary side switch during a next cycle, wherein the SS pulse has a second ON period.

2. The switching controller circuit of claim 1, wherein the SS pulse retrieves a negative current from the output voltage through turning ON the secondary side winding, so as to achieve soft switching of the primary side switch during the next cycle.

3. The switching controller circuit of claim 1, wherein the secondary side controller circuit is configured to operably detect a voltage related to the SR switch, so as to detect whether the secondary side winding of the power transformer has finished demagnetization.

4. The switching controller circuit of claim 3, further comprising:

a signal shaping circuit, which is configured to operably shape the voltage related to the SR switch, wherein the thus shaped voltage related to the SR switch is supplied to the secondary side controller circuit, for detecting whether the secondary side winding of the power transformer has finished demagnetization.

5. The switching controller circuit of claim 1, wherein the primary side controller circuit is configured to operably detect a voltage related to the power transformer according to an auxiliary winding of the power transformer, so as to detect whether the secondary side winding of the power transformer has finished demagnetization.

6. The switching controller circuit of claim 5, further comprising:

a signal shaping circuit, which is configured to operably shape the voltage related to the power transformer, wherein the thus shaped voltage related to the power transformer is supplied to the primary side controller circuit, for detecting whether the secondary side winding of the power transformer has finished demagnetization.

7. The switching controller circuit of claim 1, wherein the primary side controller circuit is configured to operably generate a clock signal, so as to determine a highest switching frequency of the switching signal, wherein when the clock signal is generated before the secondary side winding of the power transformer has finished demagnetization, the primary side controller circuit turns ON the primary side switch after a first delayed period from the clock signal, and wherein when the clock signal is generated after the secondary side winding of the power transformer has finished demagnetization, the primary side controller circuit turns ON the primary side switch after a second delayed period from the clock signal;

wherein within the first delayed period and the second delayed period, the primary side switch is forbidden to be turned ON.

8. The switching controller circuit of claim 1, wherein the secondary side controller circuit has a current threshold, wherein the secondary side controller circuit confirms whether the secondary side winding of the power transformer has finished demagnetization according to a current flowing through the SR switch and the current threshold, wherein the current threshold is a settable value.

9. The switching controller circuit of claim 1, wherein the first ON period is longer than the second ON period.

10. The switching controller circuit of claim 1, further comprising:

a signal transformer, which is configured to operably transmit the clock signal from the primary side controller circuit to the secondary side controller circuit.

11. The switching controller circuit of claim 7, wherein the first delayed period is longer than the second delayed period.

12. A method configured to operably control a flyback power converter, so as to convert an input voltage to an output voltage, wherein a power transformer of the flyback power converter is coupled between the input voltage and the output voltage in an isolated manner; the method comprising:

generating a switching signal at a primary side of the flyback power converter, to control a primary side switch of the flyback power converter, thereby controlling the primary side winding of the power transformer, wherein the primary side winding is coupled to the input voltage; and generating a synchronous rectification (SR) signal at a secondary side of the flyback power converter, to control an SR switch of the flyback power converter, thereby controlling a secondary side winding of the power transformer, so as to generate the output voltage, wherein the SR signal includes an SR pulse and a soft switching (SS) pulse, wherein the SR pulse is configured to operably control the SR switch to be ON for an SR period, to achieve synchronous rectification at the secondary side, and wherein the SS pulse is configured to operably control the SR switch to be ON for an SS period, to achieve soft switching of the primary side switch;

wherein the power transformer is magnetized when the primary side switch is ON, and wherein the power transformer transfers energy obtained by magnetization of the power transformer to the output voltage when the primary side switch is OFF;

wherein under a situation where the flyback power converter operates under boundary conduction mode (BCM), after the power transformer is demagnetized through turning ON the SR switch by the SR pulse and after the secondary side winding of the power transformer has finished demagnetization, the SR switch is kept ON by the SS pulse, so as to achieve soft switching of the primary side switch during a next cycle, wherein the SS pulse has a first ON period; or wherein under a situation where the flyback power converter operates under discontinuous conduction mode (DCM), after the power transformer is demagnetized through turning ON the SR switch by the SR pulse and after the secondary side winding of the power transformer has finished demagnetization, the SR switch is turned OFF, and is subsequently turned ON by the SS pulse, so as to achieve soft switching of the primary side switch during a next cycle, wherein the SS pulse has a second ON period.

13. The method of claim 12, wherein the SS pulse retrieves a negative current from the output voltage through turning ON the secondary side winding, so as to achieve soft switching of the primary side switch during the next cycle.

14. The method of claim 12, wherein a voltage related to the SR switch is detected at the secondary side, so as to detect whether the secondary side winding of the power transformer has finished demagnetization.

15. The method of claim 14, further comprising:
shaping the voltage related to the SR switch, so as to detect whether the secondary side winding of the power transformer has finished demagnetization.

16. The method of claim 12, wherein whether the secondary side winding of the power transformer has finished demagnetization is detected by a step including:

detecting a voltage related to the power transformer via an auxiliary winding of the power transformer, so as to detect whether the secondary side winding of the power transformer has finished demagnetization.

17. The method of claim 16, further comprising:
shaping the voltage related to the power transformer, for detecting whether the secondary side winding of the power transformer has finished demagnetization.

18. The method of claim 12, further comprising:
generating a clock signal at the primary side, so as to determine a highest switching frequency of the switching signal, wherein when the clock signal is generated before the secondary side winding of the power transformer has finished demagnetization, the primary side controller circuit turns ON the primary side switch after a first delayed period from the clock signal, and wherein when the clock signal is generated after the secondary side winding of the power transformer has finished demagnetization, the primary side controller circuit turns ON the primary side switch after a second delayed period from the clock signal;

wherein within the first delayed period and the second delayed period, the primary side switch is forbidden to be turned ON.

19. The method of claim 12, wherein whether the secondary side winding of the power transformer has finished demagnetization is detected by a step including:
confirming whether the secondary side winding of the power transformer has finished demagnetization according to a current flowing through the SR switch and the current threshold, wherein the current threshold is a settable value.

20. The method of claim 12, wherein the first ON period is longer than the second ON period.

21. The method of claim 12, further comprising:
transmitting the clock signal from the primary side of the flyback power converter to the secondary side of the flyback power converter via a signal transformer.

22. The method of claim 18, wherein the first delayed period is longer than the second delayed period.

* * * * *